(12) United States Patent
Pappas et al.

(10) Patent No.: US 8,594,278 B2
(45) Date of Patent: Nov. 26, 2013

(54) TEST SYSTEM FOR VOICE COMMUNICATIONS SYSTEMS

(75) Inventors: Andrew G. Pappas, Hicksville, NY (US); Mark Sawers, Fairfield, CT (US)

(73) Assignee: IPC Systems, Inc., Jersey City, NJ (US)

( * ) Notice: Subject to any disclaimer, the term of this patent is extended or adjusted under 35 U.S.C. 154(b) by 184 days.

(21) Appl. No.: 12/952,897

(22) Filed: Nov. 23, 2010

(65) Prior Publication Data

US 2012/0128134 A1 May 24, 2012

(51) Int. Cl.
*H04M 1/24* (2006.01)
*H04M 3/08* (2006.01)
*H04M 3/22* (2006.01)

(52) U.S. Cl.
USPC .......... 379/1.01; 379/9; 379/9.02; 379/27.01; 379/29.01; 379/29.1

(58) Field of Classification Search
USPC ............. 379/1.01, 9, 14, 10.01, 10.03, 15.01, 379/22.01, 26.01, 29.01, 29.02, 29.1, 9.02, 379/27.01, 27.04
See application file for complete search history.

(56) References Cited

U.S. PATENT DOCUMENTS

| | | | | |
|---|---|---|---|---|
| 4,591,671 A | * | 5/1986 | Pinede et al. | 379/27.01 |
| 4,995,070 A | * | 2/1991 | Shin | 379/27.08 |
| 5,187,705 A | * | 2/1993 | Mano | 370/244 |
| 5,528,661 A | * | 6/1996 | Siu et al. | 379/29.01 |
| 5,553,059 A | * | 9/1996 | Emerson et al. | 370/248 |
| 6,154,523 A | * | 11/2000 | Hofmann et al. | 379/22 |
| 6,185,281 B1 | * | 2/2001 | Thai | 379/9.01 |
| 6,301,345 B1 | * | 10/2001 | Suzuki | 379/156 |
| 6,304,634 B1 | * | 10/2001 | Hollier et al. | 379/22.02 |
| 7,206,743 B2 | * | 4/2007 | Bonnifait et al. | 704/270 |
| 7,260,184 B1 | * | 8/2007 | Howard et al. | 379/9 |
| 7,400,586 B2 | * | 7/2008 | Izundu et al. | 370/241 |
| 2001/0028708 A1 | * | 10/2001 | Tanaka et al. | 379/156 |
| 2001/0038688 A1 | * | 11/2001 | Suzuki | 379/156 |
| 2002/0168059 A1 | * | 11/2002 | Ebisawa et al. | 379/156 |
| 2008/0144606 A1 | | 6/2008 | Newman | 370/352 |
| 2008/0146216 A1 | | 6/2008 | Newman et al. | 455/424 |
| 2008/0162644 A1 | * | 7/2008 | Krishnan et al. | 709/206 |
| 2011/0243001 A1 | | 10/2011 | Yang | 370/252 |

FOREIGN PATENT DOCUMENTS

WO WO 2005/008940 A2 1/2005
WO WO 2010/064771 A1 6/2010

OTHER PUBLICATIONS

Int'l Search Report and Written Opinion of the Int'l Searching Authority, PCT/US11/060142, Feb. 10, 2012.

* cited by examiner

*Primary Examiner* — Binh Tieu
(74) *Attorney, Agent, or Firm* — Fitzpatrick, Cella, Harper & Scinto

(57) ABSTRACT

Systems, methods, and computer program products are provided for testing a voice communication system. A job instruction is transmitted from an application server to a turret via a communications network. The application server causes the turret to execute at least one diagnostic test based on the job instruction. The application server receives, from the turret via the communications network, a message including a result of the at least one diagnostic test.

23 Claims, 11 Drawing Sheets

TEST SYSTEM FOR VOICE COMMUNICATIONS SYSTEMS

BACKGROUND OF THE INVENTION

1. Field of the Invention

Example aspects of the present invention generally relate to telecommunication systems, and more particularly to systems, methods, and computer program products for remote testing of a voice communication system.

2. Related Art

A turret system is a specialized key telephony switching system that allows a relatively small number of users to access a large number of external lines and provides enhanced communication features such as hoot-n-holler, push-to-talk, intercom, video, and large-scale conferencing. These features are often utilized in the financial industry such as trading floor environments, as well as security/law enforcement, public safety utilities, healthcare, and customer support (e.g., contact centers) environments.

Users interface with a turret system via a turret device, which is a telephone-like desktop device with multiple handsets and speakers and multiple buttons. A turret is either implemented in dedicated hardware (sometimes referred to as a "hard" turret) or a general-purpose computer (sometimes referred to as a "soft" turret). With the advent of Voice over Internet Protocol ("VoIP"), VoIP turret devices have moved from a fixed environment of dedicated voice communications trading resources to a more virtualized trading environment across multiple sites. This virtual environment allows resources to be shared dynamically, when and where required, across a global corporate enterprise.

Turrets are installed in one or more premises of a company, and in some cases, are periodically replaced and/or updated in some way. Typically, in order to verify that the installations, replacements, or updates were successful, technicians walk throughout one or more premises in which equipment is installed, manually testing various functions of each of the turrets. Having technicians perform testing manually is costly and time consuming.

Problems can be more quickly solved by remotely conducting tests from a common test location. The need to test turrets and related communications infrastructure to determine the physical location where a problem exists and the type of failure is technically challenging. Typically, test boards are located within the device to be tested (sometimes referred to as a "device under test" or "DUT"). The test boards include circuits that are manually connected to other circuits or test equipment via plugs and jacks. This technique has the shortcoming of requiring a large space where the test jacks and the hard wiring from the circuits can be maintained. Another shortcoming of this testing mechanism is that it requires extensive training of personnel to properly operate the DUT and test equipment. Moreover, such testing is disruptive to end users. There is the need, therefore, for an improved remote test system, particularly tailored for testing communications infrastructure and equipment.

BRIEF DESCRIPTION

The example embodiments described herein meet the above-identified needs by providing systems, methods, and computer program products for testing a voice communication system.

In one embodiment, a job instruction is transmitted from an application server to a turret via a communications network. The application server causes the turret to execute at least one diagnostic test based on the job instruction. The application server receives, from the turret via the communications network, a message including a result of the at least one diagnostic test is provided.

Further features and advantages, as well as the structure and operation, of various example embodiments of the present invention are described in detail below with reference to the accompanying drawings.

BRIEF DESCRIPTION OF THE DRAWINGS

The features and advantages of the example embodiments of the invention presented herein will become more apparent from the detailed description set forth below when taken in conjunction with the drawings.

DETAILED DESCRIPTION

The example embodiments of the invention presented herein are directed to systems, methods, and computer program products for testing a voice communication system, which are now described herein in terms of an example turret communication system in a trading environment. This is for convenience only and is not intended to limit the application of the present invention. In fact, after reading the following description, it will be apparent to one skilled in the relevant art(s) how to implement the following invention in alternative environments, such as other installations of voice communication systems (e.g., corporate, financial, security/law enforcement, utility, healthcare, customer support, contact center environments, and the like).

I. System

Figure 1:
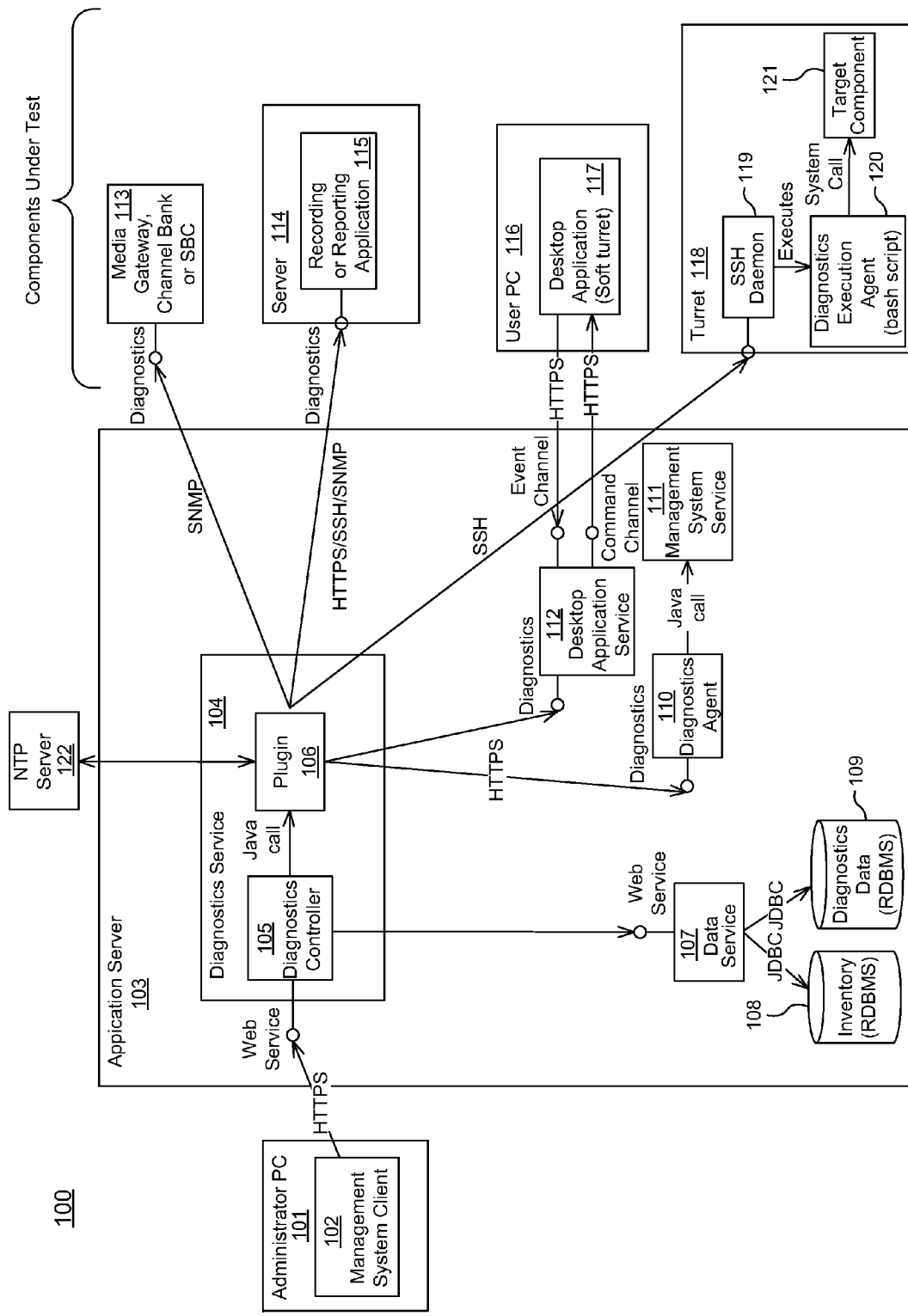
FIG. 1 is a block diagram of an example voice communication testing system in accordance with an embodiment of the present invention.

FIG. 1 is a block diagram of an example voice communication testing system 100 in accordance with an embodiment of the present invention. The system 100 includes an administrator personal computer ("PC") 101 which, in turn, includes a graphical user interface ("GUI") and a management system client 102. Management system client 102 is an application that enables an administrator to generate, configure, and manage diagnostic jobs and tests related to the voice communication system 100.

The management system client 102 communicates with an application server 103, which may also be referred to herein as "A/S", by using a communication protocol, such as Hypertext Transfer Protocol Secure ("HTTPS"). In general, application server 103 is responsible for coordinating and controlling various tests on the components in system 100. The application server 103 includes a diagnostics service 104, a data service 107, an inventory database 108, a diagnostics data database 109, a diagnostics agent 110, a desktop application service 112, and a management system service 111.

Included within the diagnostics service 104 is a diagnostics controller 105 that communicates with the plugin 106 by using interprocess communications such as remote procedure calls or Java calls. Test metadata (e.g., a test name, input parameter(s), component type(s) supported, a flag indicating whether a test would interrupt a user using a device to be tested, etc.) received from the management system client 102 is used by the diagnostics controller 105 to validate test input parameters, to translate external parameters into internal parameters, and to format any test responses to be received from a component to be tested. Table 1 illustrates an exemplary set of test metadata.

TABLE 1

| Verify Intercom Connection | |
|---|---|
| UserA: | 3108 Turret |
| UserB: | 3308 Turret |
| Test Duration (seconds): | 10 |
| Noise Level Threshold (dBm0): | −60 |
| Delay Threshold (msec): | 30 |
| Distortion Threshold (%): | 2 |
| Anomaly Count Threshold: | 10 |

The plugin 106 maintains compatibility of communication between components that use different communication protocols. In particular, the plugin 106 maintains lists of plugin classes or communication protocols implemented by each component with which the plugin 106 interfaces. Plugin classes can be installed into, or uninstalled from, the plugin 106 via the management system client 102. The plugin 106 is used to format communication messages based on the protocol implemented by the component for which the message is intended.

Diagnostics controller 105 also communicates with the data service 107 by using an application programming interface ("API") such as a web service API.

The data service 107 serves as an interface between the diagnostics controller 105 and the inventory and diagnostics data databases 108 and 109. Although the inventory database 108 and the diagnostics data database 109 are described as being separate, embodiments in which the databases are combined are contemplated. The data service 107 communicates with the inventory database 108 and the diagnostics data database 109 via an API such as Java Database Connectivity ("JDBC"). As tests are executed on devices, the devices periodically transmit messages to the databases 108 and/or 109 to store any updated test results.

The plugin 106 is communicatively coupled to a Network Time Protocol ("NTP") server 122, which maintains system clock timing and communicates with NTP server 122 via the NTP communication protocol.

The plugin 106 communicates with the diagnostics agent 110 by using a communication protocol, such as HTTPS. The diagnostics agent 110, in turn, communicates with the management system service 111 by using interprocess communications such as remote procedure calls or Java calls. The diagnostics agent 110 provides a common communications interface between the diagnostics service 104 and the implementation of a diagnostic in the management system service 111.

Diagnostic tests on a desktop application, such as desktop application 117, are executed via the desktop application service 112. The desktop application service 112 communicates with the plugin 106 by using a communication protocol, such as HTTPS.

By using a secure communication protocol, such as HTTPS, a secure communication line is maintained between various components of system 100, including the management system client 102, the diagnostics controller 105, the plugin 106, the diagnostics agent 110, the desktop application service 112, the server 114, and the user PC 116.

In general, the application server 103 is used for testing various devices, such as a media gateway 113, a server 114, a user PC 116, and a turret 118.

The media gateway 113 connects the system 100 to other networks such as a Public Switched Telephone Network ("PSTN"). The media gateway 113 also communicates with the plugin 106 by using a communication protocol, such as Simple Network Management Protocol ("SNMP").

Server 114 runs applications, such as voice logging, recording, replay, voice buffering, etc. The server 114 includes a recording or reporting application 115 that records voice data. The server 114 is communicatively coupled to the plugin 106 via the recording or reporting application 115. The plugin 106 communicates with the server 114 via a communication protocol, such as HTTPS, SNMP, or Secure Shell ("SSH").

User PC 116 communicates with the plugin 106 by using a communication protocol, such as HTTPS. In one embodiment, the plugin 106 communicates with the user PC 116 via two communication channels: a command channel for transmitting command messages and an event channel for receiving event messages. In addition, the user PC 116 includes a desktop application or soft turret 117.

Turret 118 includes a processor which executes an SSH daemon 119, a diagnostics execution agent 120. Generally, a target component 121 is any subsystem of the turret 118. For example the target component 121 can be an analog-to-digital converter 202, an audio service application 204, or a telephony application 205, which are each discussed in further detail below with respect to FIG. 2. Turret 118 communicates with the plugin 106 by using SSH daemon 119 and the SSH communication protocol. The SSH daemon 119 is communicatively coupled to the diagnostics execution agent 120, which, in turn, is communicatively coupled to the target component 121. The SSH daemon 119 controls the diagnostics execution agent 120, for example, by transmitting instructions for executing diagnostic tests. The diagnostics execution agent 120 executes tests by communicating with the target component 121 using system calls.

Figure 2:
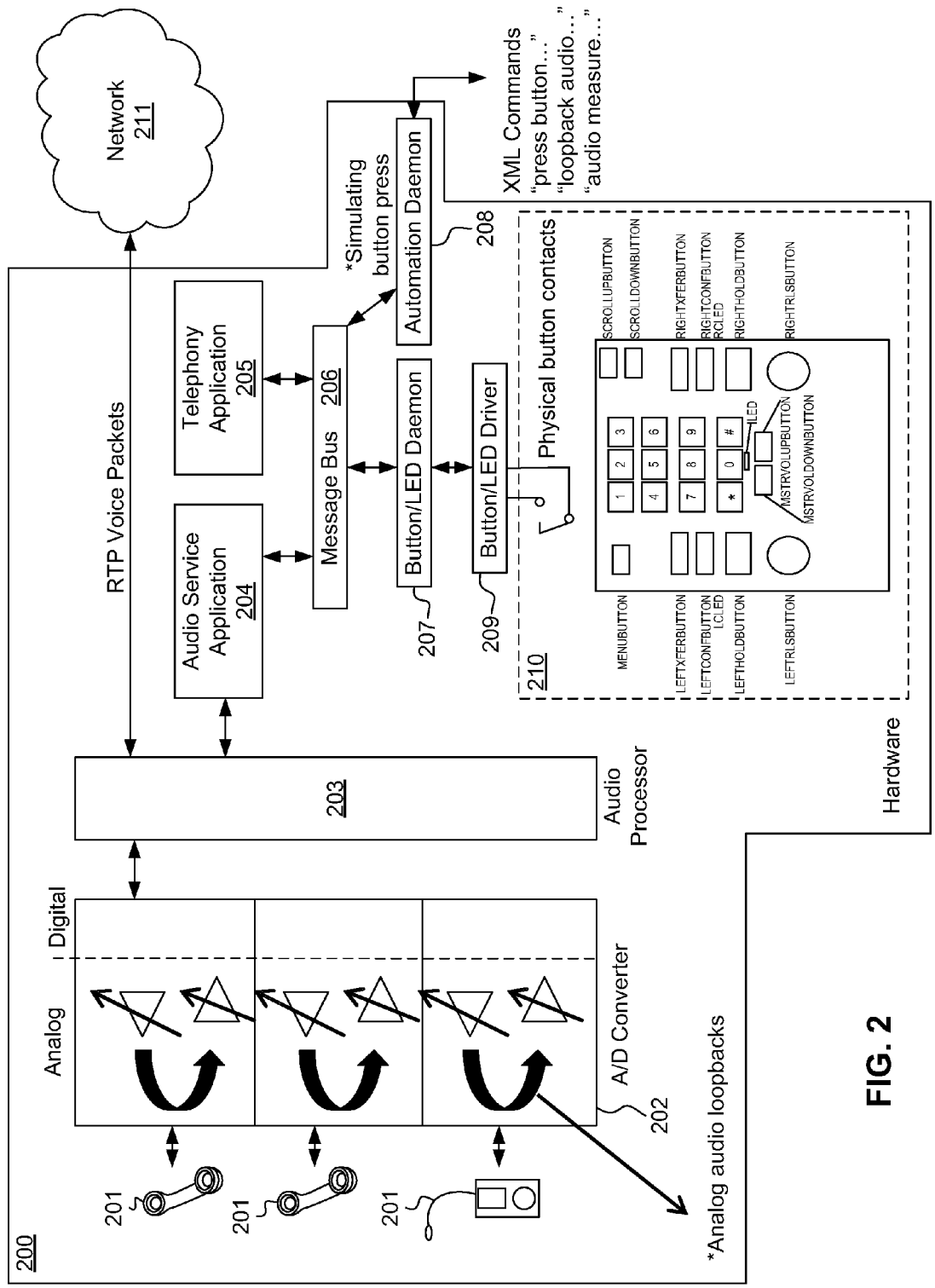
FIG. 2 depicts a more detailed block diagram of an example turret in accordance with an embodiment of the present invention.

FIG. 2 depicts a more detailed block diagram of an example turret 200 in accordance with an embodiment of the present invention. Turret 200 may be a hard turret or a soft turret. As shown in FIG. 2, the turret 118 includes handsets and speakerphones 201, analog-to-digital and digital-to-analog ("A/D") converter 202, an audio processor 203, an audio service application 204, a telephony application 205, a communication bus 206, a button/light-emitting diode ("LED") daemon 207, an automation daemon 208, a button/LED driver 209, and physical buttons and contacts 210.

The handsets and speakerphones 201 are communicatively coupled to the A/D converter 202, which is a codec that converts analog electrical signals that represent signals received from the handsets and speakerphones 201 into digital signals. The A/D converter 202 also converts digital electrical signals received from the audio processor 203 into analog signals. The A/D converter 202 has analog-to-digital loopback capability. The transmit and receive volume for handsets are controlled by amplifiers in the analog section of the A/D converter 202.

The audio processor 203 processes audio signals on the turret 200. Example audio processing functions executed by the audio processor 203 include performing sidetone generation, Fast Fourier Transforms ("FFTs"), de-jittering of audio signals, acoustic echo cancellation, frequency response control, etc.

The audio processor 203 includes active and passive audio diagnostics modules (not shown) that enable remote diagnostic testing, audio test automation, and audio testing. Example audio diagnostics modules included within the audio processor 203 include a single frequency tone generating module, a white noise generating module, an audio file playback module, and an impulse generating module.

The single-frequency tone generating module generates a single-frequency tone and transmits the tone via a particular channel of the turret 200 to either a mouthpiece or an earpiece of a handset or speakerphone of either the local turret 200 or a distant turret (not shown), e.g., a turret at a different location on the network 211. Passive audio measurement functions are used to verify the tone level and frequency on the local or distant end turret 200.

The white noise generating module generates stationary white noise and transmits the white noise via a particular channel of the turret 200 to either a mouthpiece or an earpiece of a handset or speakerphone of either the local turret 200 or a distant turret (not shown), e.g., a turret at a different location on the network 211. Passive audio measurement functions are used to verify the white noise level on the local or distant end turret 200. The white noise is used by the audio processor 203 for performing power tests and an echo return loss test, which are discussed below in further detail.

The audio file playback module includes pre-recorded reference audio files stored in a standard format, such as an 8 kHz or 16 kHz Pulse Code Modulation ("PCM") format. The audio file playback module transmits a reference audio signal via an RTP stream to a distant turret (not shown) for use in Perceptual Evaluation of Speech Quality ("PESQ") tests.

The impulse generating module generates impulses and transmits the impulses via a particular channel of the turret 200 to either a mouthpiece or an earpiece of a handset or speakerphone of the local turret 200 or a distant turret (not shown). The impulse generating module is used by the audio processor 203 for performing a round-trip delay test, which is discussed below in further detail.

Example audio tests executed by the audio diagnostic modules include a speech power test, a noise power test, an anomaly detection test, a loopback test, a peak frequency test, an echo return loss test, and a round-trip delay test. Audio tests are discussed in further detail below with respect to FIGS. 6 through 10.

The audio processor 203 also transmits and receives voice packets to and from other endpoints via the network 211 by using a communication protocol such as Realtime Transport Protocol ("RTP"). In particular, the audio processor 203 receives and decodes RTP voice packets from the network 211, and encodes and transmits RTP voice packets to the network 211.

The audio service application 204 receives messages from the communication bus 206 and routes the messages to different devices such as the audio processor 203 via a driver (not shown). The audio services application 204 also broadcasts voice messages to the network 211 via the audio processor 203.

The telephony application 205 performs call control functions, for example, by handling user data configurations for setting up a call, setting up RTP streams, ports, etc. When a button is pressed on the turret hardware 210, a message is sent to the telephony application 205, which in turn validates the message and processes the message to carry out a task associated with the pressed button (e.g., connect a call).

The communication bus 206 communicatively couples the audio service application 204, the telephony application 205, the button/LED daemon 207, and the automation daemon 208.

The button/LED daemon 207 detects signals from the button/LED driver regarding the status of physical buttons and LEDs 210 on the turret. When the status of a button or LED 210 changes the button/LED driver 209 transmits an interrupt message to the button/LED daemon 207, which then transmits a message via the message bus to one or more endpoints via the communication bus 206.

The automation daemon 208 receives Extensible Markup Language ("XML") commands from the plugin 106 of FIG. 1 via a communication protocol such as SSH. The commands received from the plugin 106 are instructions to execute one or more tests, such as testing the pressing of a button, testing the loopback audio, performing audio measurements, etc. The automation daemon 208 forwards the commands to an appropriate destination via the communication bus 206.

Figure 3:
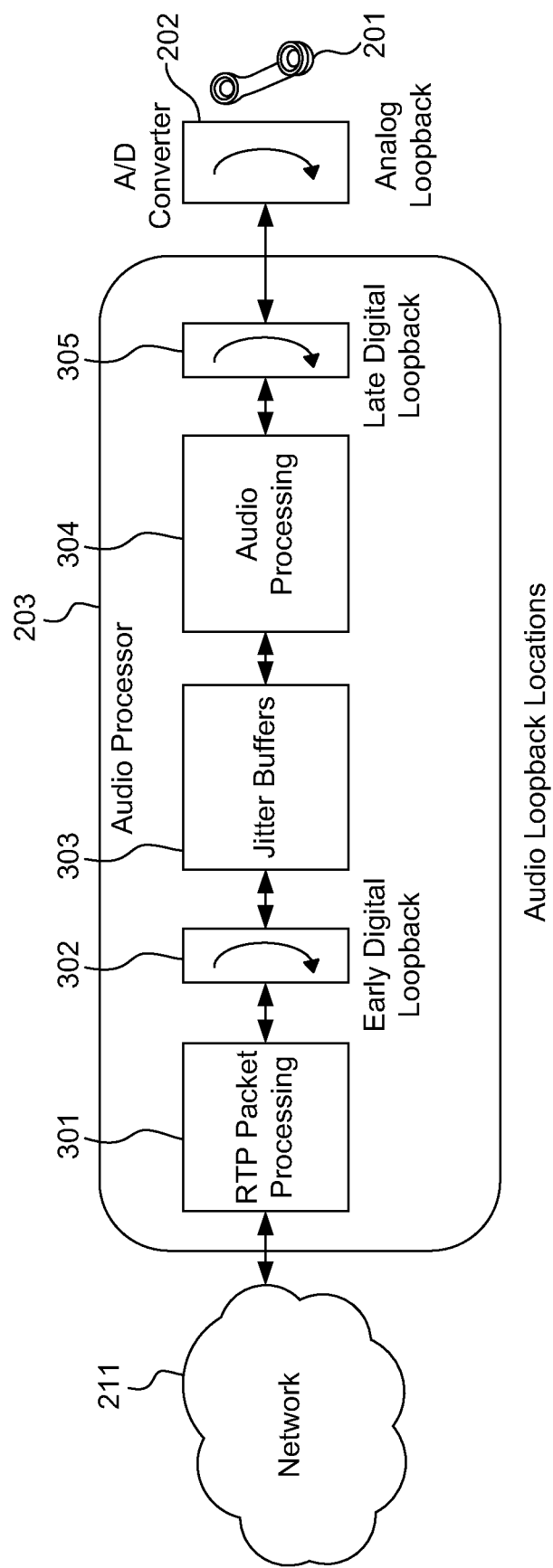
FIG. 3 is a more detailed block diagram of an example audio processor in accordance with an embodiment of the invention.

FIG. 3 is a more detailed block diagram of an example audio processor 203 in accordance with an embodiment of the invention. As shown in FIG. 3, the audio processor 203 includes an RTP packet processing module 301, jitter buffers 303, and an audio processing module 304. The audio processor 203 is communicatively coupled to the network 211 and to the A/D converter 202 via a RTP packet processing module 301. The A/D converter 202 is communicatively coupled to a handset or speakerphone 201.

As shown in FIG. 3, three loopback locations are provided—two digital loopback locations and one analog loopback location. The diagnostics service 104 can isolate detected errors or failures to a particular part of the system 100 by executing loopback tests using one or more of the three loopback locations. While the audio processor 203 is executing any of the three types of loopback tests, the audio processor 203 automatically bypasses audio functions that would interfere with loopback testing, such as side tone generation and acoustic echo cancellation.

An early digital loopback location is indicated by block 302. The early digital loopback location 302 enables loopback testing of RTP packets prior to the packets having undergone de-jittering and audio processing.

A late digital loopback location is indicated by block 305. The late digital loopback location 305 enables loopback testing of data that has undergone audio processing.

An analog loopback location is indicated by the A/D converter 202. The analog loopback location 202 enables loopback testing of analog signals just prior to the signal being transmitted to, or received from, the handset or speakerphone 201. Loopback tests are discussed in further detail below.

II. Process

A. Job Management

In general, job management includes any diagnostic job-related procedure that is executed by the administrator PC 101 in conjunction with the management system client 102. For example, job management includes generating and configuring a new job, opening and/or configuring an existing job, executing a job, and scheduling a job.

1. Job Generation

Figure 4:
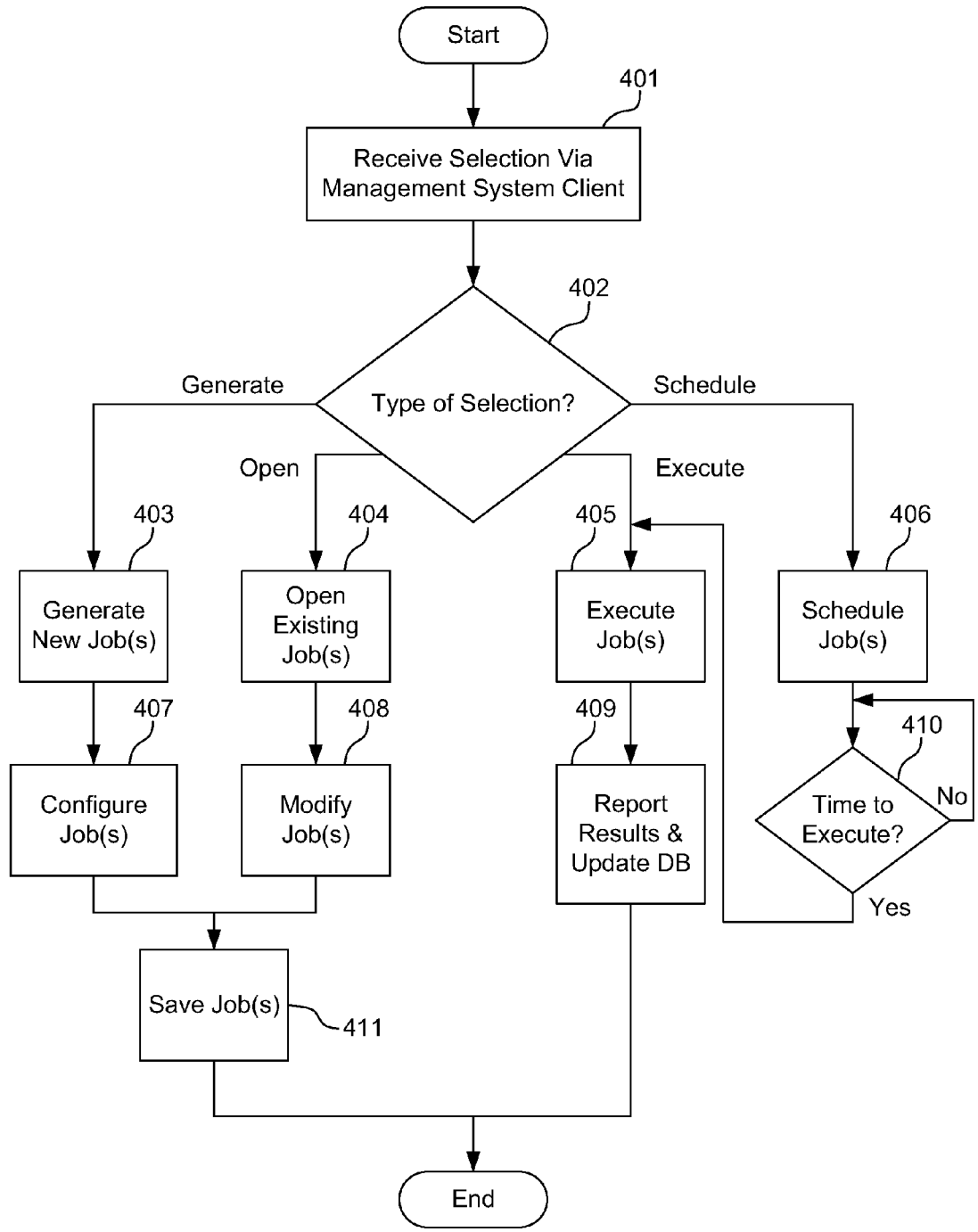
FIG. 4 illustrates an example procedure for managing jobs.

FIG. 4 illustrates an example procedure 400 for managing jobs. A job is defined by a test template (e.g., Table 1) that references one or more tests and one or more components to be tested, as well as any test parameters to be used for the tests. For each job there is a corresponding job entry stored in the diagnostics data database 109 including metadata such as a job identifier, one or more test identifiers, one or more component identifiers, and corresponding parameters, if any, to be used for the job.

A GUI of the administrator PC 101 displays GUI elements, such as icons, buttons, and/or checkboxes, corresponding to various tests which can be performed as well as test criteria configurations and thresholds. Selections available to be entered via the GUI include generating, opening, executing, and scheduling a job. When selections are made via the GUI, a corresponding message is transmitted from the management system client 102 to the diagnostics service 104. At block 401, the diagnostics service 104 receives from the management system client 102 a selection of a job management option entered via the GUI of the administrator PC 101 together with any associated job parameters. At block 402, the diagnostics service 104 determines a type of the selection received at block 401.

If at block 402 the diagnostics service 104 determines that the type of the selection received at block 401 corresponds to generating a new job, then at block 403 the diagnostics service 104 causes the management system client 102 to display a GUI element, such as a window, enabling the generation of a new job.

At block 407, a job(s) is configured via the management system client 102. In particular, jobs are configured by selecting specific tests to be executed and selecting specific components for which the tests are to be executed, as well as specifying any test parameters that are to be used in connection with the execution of the tests.

At block 411, the diagnostics service 104 stores in the diagnostics data database 109 a job entry corresponding to the job(s) generated and configured at blocks 403 and 407, respectively. As discussed above, each job entry stored in the diagnostics data database 109 includes a job identifier, one or more test identifiers, one or more component identifiers, and corresponding parameters, if any, to be used for the job.

2. Job Modification

If at block 402 the diagnostics service 104 determines that the type of the selection received at block 401 corresponds to opening an existing job, then at block 404 the diagnostics service 104 causes the management system client 102 to display a GUI element, such as a window, enabling the opening of an existing job.

At block 408, a job(s) is viewed and/or modified via the management system client 102. The procedures used for modifying job(s) are similar to those for configuring jobs, as discussed above with respect to block 407.

At block 411, the diagnostics service 104 stores in the diagnostics data database 109 the job(s) opened and modified at blocks 404 and 408, respectively, as discussed above with respect to block 411.

3. Job Execution

If at block 402 the diagnostics service 104 determines that the type of the selection received at block 401 corresponds to executing a job, then at block 405 the diagnostics service 104 causes the management system client 102 to display a GUI element, such as a dialog box, through which an administrator can confirm that a job is to be executed.

At block 409, the diagnostics service 104 executes a job. In particular, the diagnostics service 104 transmits to the device to be tested an execution message as discussed in further detail below with respect to FIG. 5. The diagnostic data database 109 is updated with the results of the job, and the diagnostics service 104 reports the results to the management system client 102. The management system client 102 displays the results. The execution of jobs, the updating of the diagnostic data database 109 with the results of the job, and reporting the results of jobs to the management system client 102 are each discussed in further detail below with respect to FIGS. 5 through 10.

4. Job Scheduling

If at block 402, the diagnostics service 104 determines that the type of the selection received at block 401 corresponds to scheduling the execution of a job to take place at a later time, then at block 406 the diagnostics service 104 causes the management system client 102 to display a GUI element, such as a window, enabling the scheduling of the execution of a job.

Once a job has been scheduled, the job is executed according to its schedule. In particular, at block 410, the diagnostics service 104 periodically retrieves the current time from the NTP server 122. The diagnostics service 104 determines whether the current time retrieved from the NTP server 122 matches the time a scheduled job was set to begin at block 406. If the current time does not match the scheduled time then the diagnostics service 104 waits a predetermined time period before testing the time again. If the current time matches the scheduled time then the diagnostics service 104 progresses to blocks 405 and 409 to execute the job and store and report the results of the job, as discussed above.

a. Conflicts

In one embodiment, the diagnostics service 104 determines whether the scheduled time of a job will generate a conflict with another job and/or current status of the network and devices or components under test. For example, a conflict exists if the diagnostics service 104 attempts to use a turret while the turret is being used by a person. The diagnostics service 104 may also determine that a conflict exists based on a flag included within metadata of a job. Before executing a test on a device, the diagnostics service 104 transmits a status request message to a diagnostics agent of the device. The device, if functioning properly, transmits to the diagnostics service 104 a status message indicating a status of either "in use" or "not in use". If, after a predetermined timeout period has passed since transmitting a status request message, the diagnostics service 104 has received no response from the device then the diagnostics service 104 times out and does not execute the job. In one embodiment, the status request message is communicated in a SIP message or an HTTPS message.

If the diagnostics service 104 identifies a conflict, then it causes the management system client 102 to display a warning dialog box indicating that executing the job according to that schedule will interrupt user service. The management system client 102 can permit an administrator to override the warning, causing the diagnostics service 104 to execute the job despite the warning.

Alternatively, the diagnostics service 104 can prevent the job from being executed if a conflict is identified. In particular, if the diagnostics service 104 receives a status message from the device indicating a status of "in use" then the diagnostics service 104 postpones testing the device for a predetermined amount of time. After the predetermined amount of time as passed, the diagnostics service 104 transmits another status request message to the device, only executing the job after receiving a status message from the device indicating a status of "not in use". If the diagnostics service 104 receives a status message from the device indicating a status of "not in use" then the diagnostics service 104 executes the test on the device. Alternatively, or in addition, the diagnostics service 104 schedules testing to occur in a time period during which a user is less likely to be (or simply not) using a turret. For instance, the diagnostics service 104 can schedule a job to be executed overnight, while an office is closed for business.

In addition, the diagnostics service 104 restricts any tests that utilize a common resource, such as a private line, by enabling only one test at a time to be executed using the common resource.

B. Executing a Job

Figure 5:
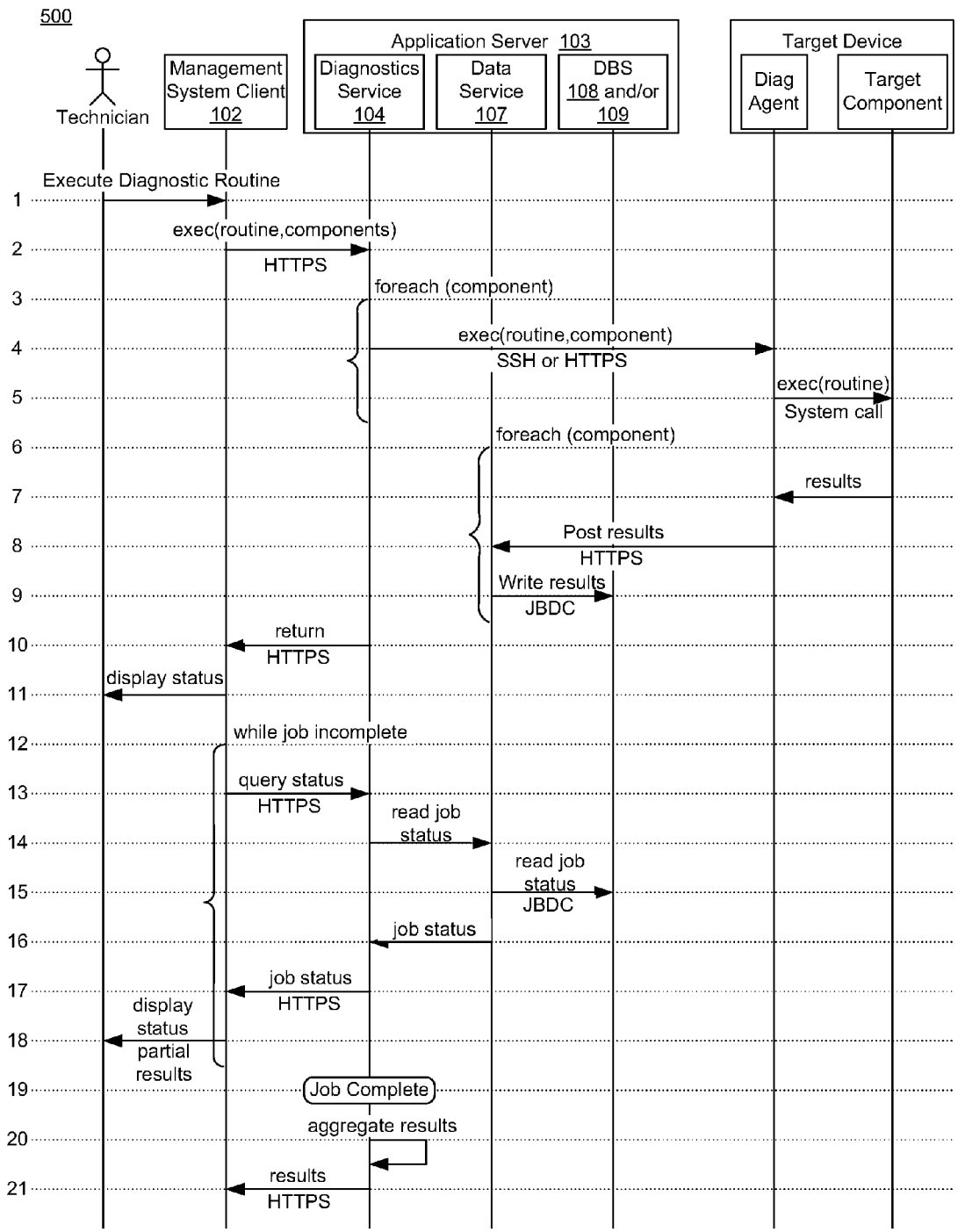
FIG. 5 illustrates an example procedure for executing a job.

FIG. 5 illustrates an example procedure 500 for executing a job. As will be understood by those having ordinary skill in the art, the steps illustrated in FIG. 5 need not be executed in the order shown. Rather, the steps illustrated in FIG. 5 may be executed out of order and/or simultaneously with respect to one another.

As shown in FIG. 5, the management system client 102 receives via a user interface a command to execute a job, which has been previously configured and has a corresponding entry stored in the diagnostics data database 109.

The management system client 102 transmits an execution message to the diagnostics service 104 via a communication protocol such as HTTPS. The execution message includes a reference to a job stored in the diagnostics data database 109. As discussed above with respect to FIG. 4, each job entry stored in the diagnostics data database 109 includes metadata, such as a test name, input parameter(s), component type(s) supported, a flag indicating whether a test would interrupt a user using a device to be tested, etc.

In response to receiving the execution message from the management system client 102, the diagnostics service 104 executes the test(s) according to the information included in the execution message. In particular, for each component specified in the execution message, the diagnostics service 104, executes the test(s) specified in the execution message, using the parameters, if any, specified in the execution message. For example, the diagnostics service 104 generates, based on the execution message received from the management system client 102, an individualized execution message for each component to be tested. The diagnostics service 104 transmits to each component to be tested, e.g., via the diagnostics execution agent 120 of a target device as shown in FIG. 5, a corresponding individualized execution message via a communication protocol such as SSH or HTTPS. The individualized execution message identifies a target component of the target device and indicates which tests or routines are to be executed on the target component.

In response to receiving the individualized execution message from the diagnostics service 104, the diagnostics agent of the target device transmits a finalized execution message to the target component. The finalized execution message instructs the target component to execute the tests or routines specified by the individualized execution message.

In response to receiving the finalized execution message from the diagnostics agent, the target component executes the test(s) specified in the finalized execution message.

After the test(s) have been executed, the target component transmits a results message indicating the results of the test to the diagnostics agent. In response, the diagnostics agent transmits a post results message to the data service 107 via a communication protocol such as HTTPS. In response to receiving the post results message from the diagnostics agent, the data service 107 writes the test results into the inventory database 108 and/or the diagnostics data database 109 via an API such as Java Database Connectivity ("JDBC").

The diagnostics service 104 transmits a return message indicating the status of the job(s) to the management system client 102 via a communication protocol such as HTTPS. The management system client 102 displays the status of the job(s) via the GUI of the administrator PC 101.

The management system client 102 transmits a query status message to the diagnostics service 104 via a communication protocol such as HTTPS. The diagnostics service 104 transmits a read job status message to the data service 107. The data service 107 reads the job status from the inventory database 108 and/or the diagnostics data database 109 via an API such as JDBC and transmits a job status message to the diagnostics service 104. The diagnostics service 104 forwards the job status message to the management system client 102 via a communication protocol such as HTTPS. The management system client 102 displays the status of the job(s) via the GUI of the administrator PC 101.

When the job is complete, the diagnostics service 104 aggregates the job results and transmits an aggregated results message to the management system client 102 via a communication protocol such as HTTPS. The management system client 102 displays the aggregated results via the GUI of the administrator PC 101.

C. Tests

Figure 6:
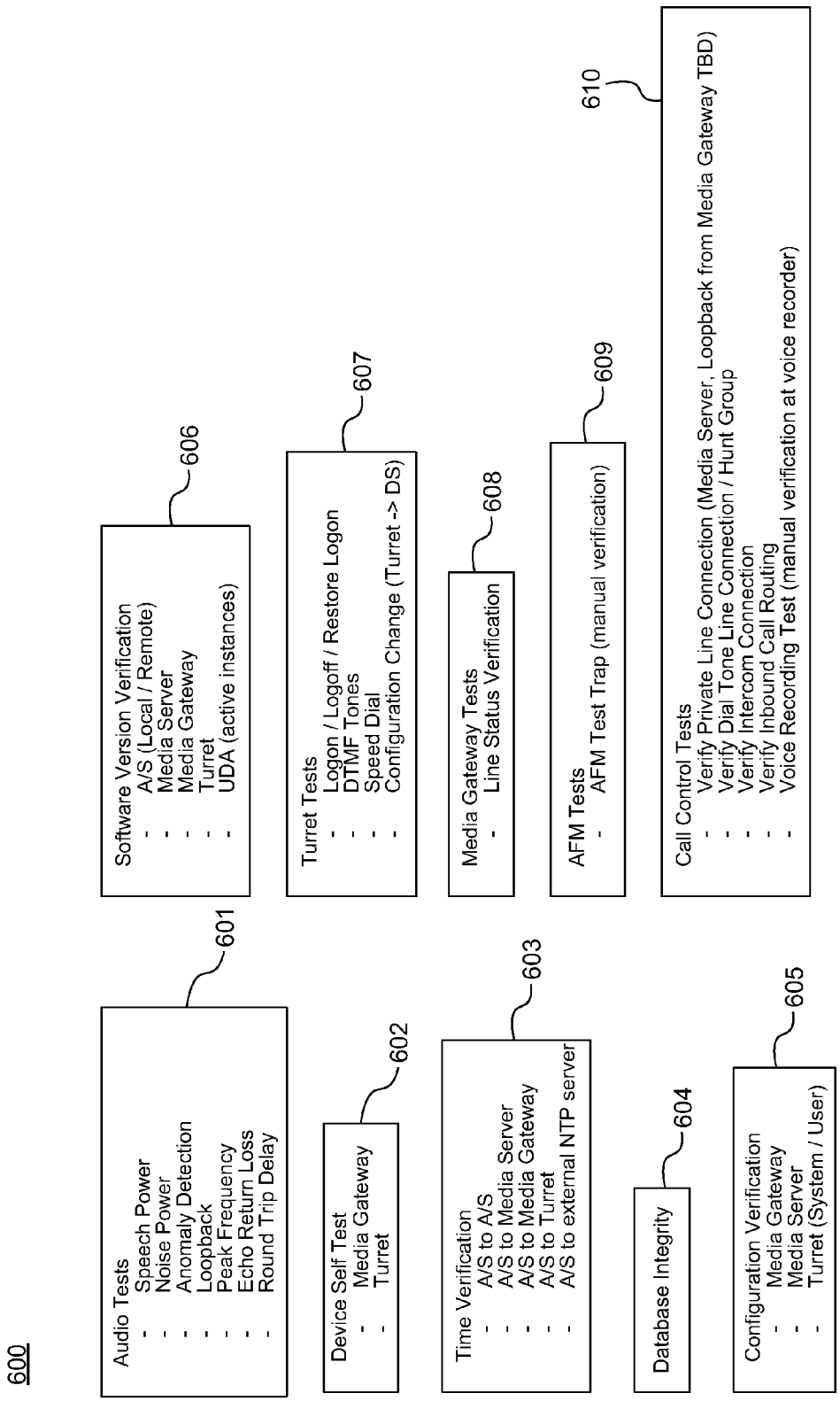
FIG. 6 is block diagram listing example test procedures in accordance with example embodiments of the invention.

FIG. 6 is block diagram listing example test procedures 601, 602, 603, 604, 605, 606, 607, 608, 609, and 610 (collectively "601 through 610") in accordance with example embodiments of the invention. Test procedures 601 through 610 are generated, configured, saved, scheduled, and/or executed via the management system client 102, as discussed above with respect to FIG. 4.

1. Audio Tests a. Audio Test Scenarios

Block 601 represents audio tests. Audio tests may be executed in one or more audio test scenarios, such as a detailed audio test scenario, a conference call test scenario, a turret call via gateway/PBX test scenario, and a local audio interface test scenario.

i. Direct Turret-To-Turret Test Scenario

Figure 7:
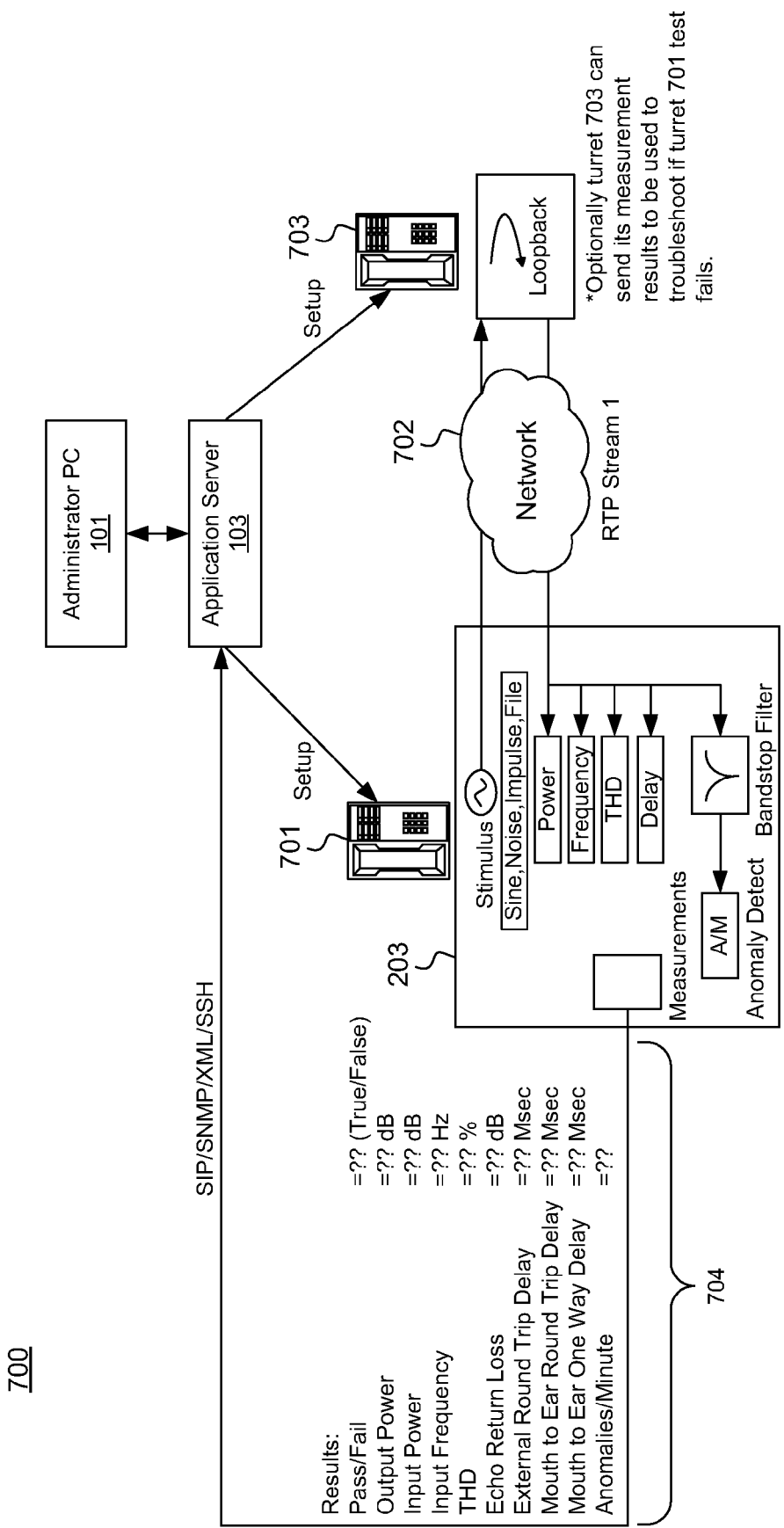
FIG. 7 illustrates an example test scenario.

FIG. 7 illustrates an example test scenario 700. Turret 701 executes an audio test by using one or more audio test modules included in the audio processor 203. Example audio test modules, including signal sources, measurement modules, and a bandstop filter, are shown in FIG. 7. Turret 701 transmits voice data packets to turret 703 via the network 702. Because turret 703 is in a loopback mode, turret 701 is able to receive the voice data packets back from itself via the network 702. Turret 701 performs measurements on the received voice data, determines test results 704, and transmits the test results 704 to the application server 103. The application server 103 forwards the results 704 to the administrator PC 101 for display via the GUI of the administrator PC 101.

ii. Conference Call Test Scenario

Figure 8:
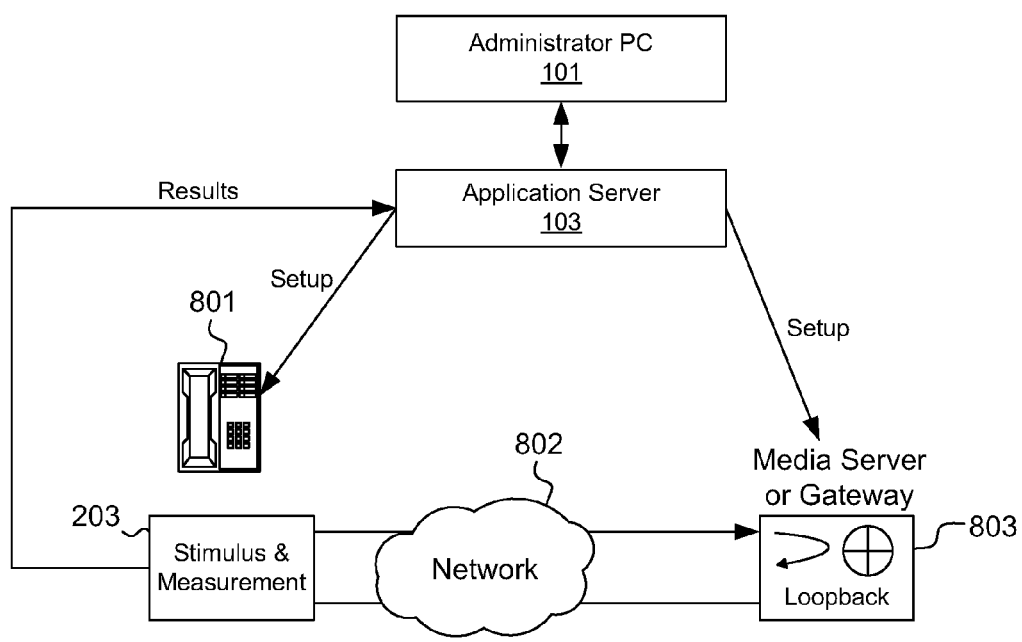
FIG. 8 illustrates an example conference call test scenario.

FIG. 8 illustrates an example conference call test scenario 800, particularly a turret-to-media server or gateway conference call scenario. A conference call, which is common in the trading industry, is a call in which more than two calling parties communicate with each other on a single call by having their respective communication signals linked via a switch or a bridge. In a conference call test, the application server 103 determines a muting configuration for each turret. In one embodiment, the conference is configured to enable all parties to speak and listen simultaneously. Alternatively, the conference is configured to enable one turret to mute the audio of another turret. Turret 801 executes an audio test by using one or more audio test modules included in the audio processor 203. Turret 801 transmits voice data packets, or stimulus, to a media server or gateway 803 via the network 802. Because the media server or gateway 803 is in a loopback mode, turret 801 receives the voice data packets back from the media server or gateway 803 via the network 802. Turret 801 performs measurements on the received voice data, determines test results, such as the test results 704 of FIG. 7, and transmits the test results to the application server 103. The application server 103 forwards the results to the administrator PC 101 for display via the GUI of the administrator PC 101.

iii. Turret-To-Turret via Gateway/PBX Test Scenario

Figure 9:
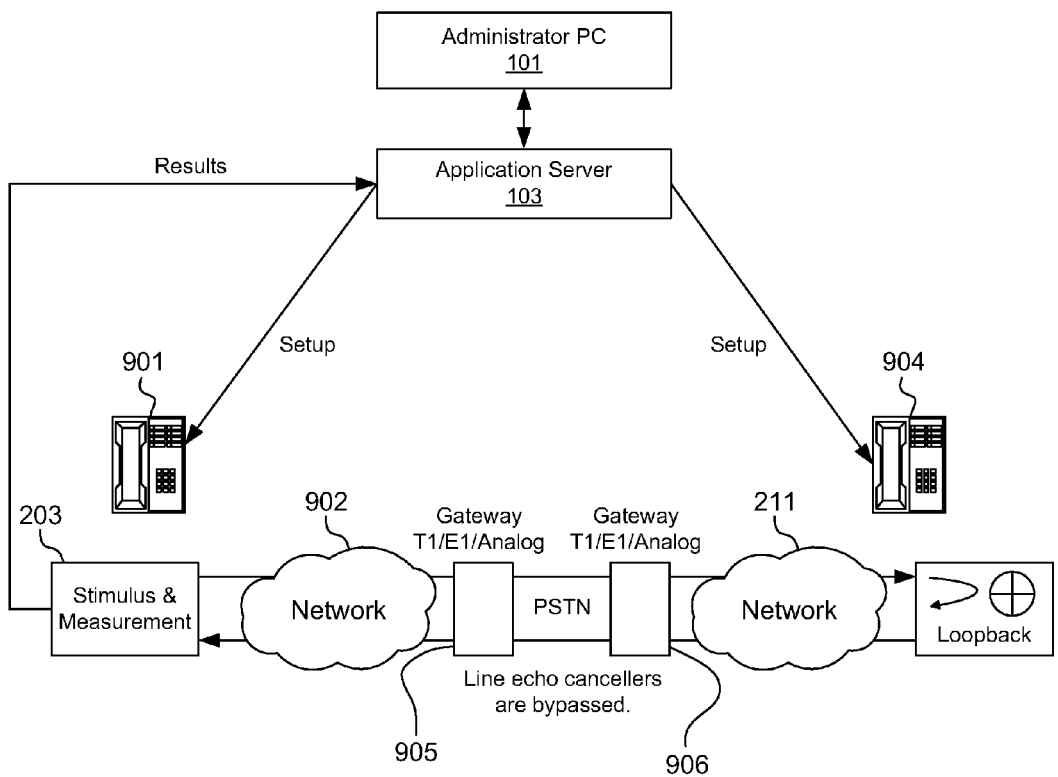
FIG. 9 illustrates an example scenario for testing a call between two turrets via a gateway/private branch exchange.

FIG. 9 illustrates an example scenario 900 for testing a call between two turrets via a gateway/private branch exchange ("PBX"), particularly in a turret-to-turret via a gateway or PBX scenario. Turret 901 executes an audio test by using one or more audio test modules included in the audio processor 203. Turret 901 transmits voice data packets, or stimulus, to turret 904 via a communication path including a network 902, a gateway 905, a public switched telephone network ("PSTN"), a gateway 906, and a network 903. Channel line echo cancellers within the gateways 905 and 906 are in a bypass mode. In the event that channel line echo cancellers cannot be bypassed, for instance, due to third-party equipment not managed by system 100, two one-way audio tests are executed. Because turret 904 is in a loopback mode, turret 901 receives the voice data packets back from the turret 904. Turret 901 performs measurements on the received voice data, determines test results, such as the test results 704 of FIG. 7, and transmits the test results to the application server 103. The application server 103 forwards the results to the administrator PC 101 for display via the GUI of the administrator PC 101.

iv. Local Audio Interface Test Scenario

Figure 10:
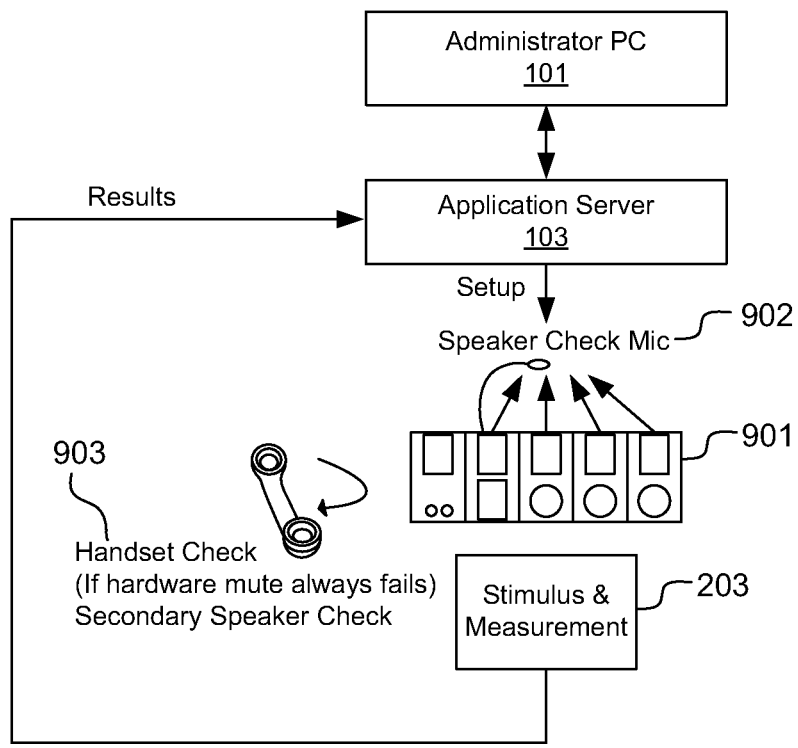
FIG. 10 illustrates an example scenario for testing a local audio interface of a turret.

FIG. 10 illustrates an example scenario 1000 for testing a local audio interface of a turret, particularly performing acoustic detection on a handset, speaker, or hands-free microphone. Turret 901 executes an audio test by using one or more audio test modules included in the audio processor 203. Turret 901 transmits an audio stimulus signal to one or more speakers on turret 901 to audibly reproduce the audio signal. Turret 901 detects the audio signal via a microphone 902 of turret 901. Turret 901 detects the audio signal via a microphone 902 of turret 901. Alternatively, or in addition, turret 901 transmits the audio stimulus signal to one or more speakers on a handset of turret 901 to audibly reproduce the audio signal. Turret 901 detects the audio signal via a microphone of the handset of turret 901. Turret 901 performs measurements on the received audio signal, determines test results, such as the test results 704 of FIG. 7, and transmits the test results to the application server 103. The application server 103 forwards the results to the administrator PC 101 for display via the GUI of the administrator PC 101.

As discussed above with respect to FIG. 2, the audio processor 203 includes active and passive audio diagnostics modules that enable remote diagnostic testing, audio test automation, and audio testing. Example audio diagnostics modules included within the audio processor 203 include a single frequency tone generating module, a white noise generating module, an audio file playback module, and an impulse generating module. The turret 118 or 117 accepts Session Initiation Protocol ("SIP") INVITE messages that request auto answer, loopback, and play a tone on a specific channel, handset or speaker.

Referring back to block 601, example audio tests executed by the audio processor 203 via audio diagnostic modules include a speech power test, a noise power test, an anomaly detection test, a loopback test, a peak frequency test, an echo return loss test, and a round-trip delay test.

b. Speech Power Test

The audio processor 203 executes a speech power test by measuring the power (e.g., in dBm0) for portions of audio that contain speech on any channel and in any direction (e.g., to or from a mouthpiece or an earpiece). A sinusoidal generator within the audio processor 203 of a local turret generates a stimulus, sweeping a sine wave signal from 0 Hz to a maximum bandwidth frequency (e.g., 8 kHz for a 16 kHz sampling rate) at a constant amplitude. In one embodiment, the stimulus is generated as early in the signal chain as possible, as close to the microphone of the local turret as possible. The stimulus is transmitted via a communications network to a remote turret. The audio processor 203 of either the local turret or the remote turret computes an amplitude response by performing power measurements at multiple frequencies in the sweep, with a predetermined (e.g., low or high) frequency resolution. Each power measurement can be made at the remote turret, late in the signal chain (e.g., as close to the speaker as possible), or at the local turret, after the audio has been looped back by the remote turret. The diagnostics execution agent 120 compares the amplitude response to predetermined amplitude response patterns to identify any effect(s) the turret 200 has on perceived loudness of speech, as well as potential audio quality issues such as "hollow" sound, "tinny" sound, and/or "bassy" sound. Test results are transmitted to the application server 103.

c. Noise Power Test

The audio processor 203 executes a noise power test by measuring the power (e.g., in dBm0) for portions of audio that do not contain speech on any channel and in any direction (e.g., to or from a mouthpiece or an earpiece). A local turret creates a test call with a remote turret. During a silent portion of the call, e.g., a portion that does not contain speech, average power is measured. The average power can be measured by the audio processor 203 of the remote turret, late in the signal chain, as close to a speaker as possible, or by the audio processor 203 of the local turret, after the audio has been looped back by the remote turret. The average power measurement is compared to a predetermined expected value and the results are transmitted to the application server 103.

d. Anomaly Detection Test

The audio processor 203 initiates an anomaly detection test by transmitting a narrowband signal such as a tone from one turret to another device or turret that is configured in a loopback mode. The audio processor 203 then measures any anomalies detected from the returned signal. The result of an anomaly detection test includes a number of anomalies detected over time for a particular turret.

e. Loopback Test

The audio processor 203 initiates a loopback test by activating early digital loopback, late digital loopback, or analog loopback, as discussed in further detail above with respect to FIG. 3. In general, each loopback test includes configuring one device, such as a turret, to be in a loopback mode, transmitting a stimulus signal, and measuring the resulting signal that is returned by the looped device. When the audio processor 203 is operating in any of the three loopback modes, the audio processor 203 automatically bypasses audio functions that would interfere with loopback testing, such as side tone generation and acoustic echo cancellation.

In one embodiment, loopback testing is used to verify the functionality of audio interfaces between each turret in a network of turrets. The diagnostics controller 105 uses a predetermined set of turrets for testing. Alternatively, the diagnostics controller 105 searches a database for available turrets to avoid interrupting users who are currently utilizing their turrets. The diagnostics controller 105 generates pairings between the turrets to be tested and establishes calls between each pairing. The diagnostics controller 105 assigns each turret a narrowband audio test tone having a unique frequency that is not harmonically related to the test tones of each other turret. In this way, potential interference caused by speakers of nearby turrets is mitigated. In one embodiment, the diagnostics controller 105 stores a table of turrets and corresponding test tone frequencies in the database 108 or 109. The loopback test may be a short-term test or a long-term test.

i. Short-Term Loopback Test

For each pairing of turrets, the diagnostics controller 105 designates one turret as the source, one as the destination, and initiates a call from the source turret to the destination turret. The destination turret is configured in a loopback mode, with any potentially interfering processes (e.g., sidetones and echo cancellation) bypassed, and with a predetermined gain level. The audio processor 203 of the source turret transmits the test tone. The audio processor 203 measures an audio level of the looped back audio signal at the test tone frequency, for example, by detecting the signal after filtering it with a narrowband filter. The audio processor 203 compares the measured audio level to predetermined threshold. If the audio level is greater than or equal to the threshold then the diagnostics execution agent 120 transmits to the diagnostics service 104 a message indicating that the test has passed. If the measured audio level is less than the threshold then the diagnostics execution agent 120 transmits to the diagnostics service 104 a message indicating that the test has failed, and optionally indicating details regarding any failure(s).

ii. Long-Term Loopback Test

In one embodiment, a long-term loopback test is used to detect anomalies that may not be detected with a short-term loopback test. In this way, anomalies generated by packet loss, jitter buffer adjustments, buffer overruns, buffer underruns, etc., can be detected. The audio processor 203 of the source turret transmits the test tone, in the same manner as in the short-term loopback test. The audio processor 203 of the source turret filters the looped back audio with a high-Q bandstop filter. Any audio signals at the output of the filter are unwanted noise and/or distortion. The audio processor 203 then measures an audio level of the filtered looped back audio signal across a predetermined band of frequencies over a predetermined period of time. The audio processor 203 compares the measured audio level to predetermined threshold. If the audio level is less than the threshold then the diagnostics execution agent 120 transmits to the diagnostics service 104 a message indicating that the test has passed. If the measured audio level is greater than or equal to the threshold then the diagnostics execution agent 120 transmits to the diagnostics service 104 a message indicating that the test has failed (e.g., that an anomaly has occurred), and optionally indicating details regarding any failure(s), such as how many anomalies occurred at a particular frequency over a particular period of time.

f. Peak Frequency Test

The audio processor 203 executes a peak frequency test by measuring the frequency for any peak sustained signals on any channel and in any direction (e.g., to or from a mouthpiece or an earpiece). A test call is established between a local turret and a remote turret. The audio processor 203 of either the local turret or the remote turret captures an audio signal, and computes an FFT of the captured audio signal, storing power measurements in corresponding frequency bins. The audio processor 203 then identifies the frequency bin having the largest consecutive power measurements over a predetermined number of FFT computations. The audio processor 203 transmits the corresponding frequency (e.g., in Hz) to the diagnostics service 104.

g. Echo Return Loss Test

The audio processor 203 executes an echo return loss test by measuring the echo return loss on a particular channel. In particular, the audio processor 203 measures the input/output power on a particular channel using a white noise or .WAV file audio stimulus. The audio processor 203 uses this for measuring line echo canceller single talk echo return loss when connected to a gateway with no loopbacks enabled. The white noise generator is used as the audio test stimulus. The return loss (in dB) is computed as the difference between the output power (in dB) and the input power (in dB).

h. Round-Trip Delay Test

The audio processor 203 executes a round-trip delay test by measuring the audio round-trip delay with a loopback in place somewhere in the audio path outside of the turret that is performing the measuring. The impulse generator is used as the audio test stimulus. The audio processor 203 can measure external round-trip delay (e.g., in milliseconds ("ms")), mouth-to-ear round-trip delay (in ms), and mouth-to-ear one-way delay (in ms).

i. DTMF Test

The diagnostics service 104 initiates a DTMF test by transmitting a message to the turret 118 instructing the diagnostics execution agent 120 to emulate the pressing of a button on the turret 118. The diagnostics execution agent 120, particularly the audio processor 203, detects audio level (tone and/or noise) before and after the emulated button press occurs, and compares the audio tone level to a predetermined threshold. If the audio level is greater than or equal to the threshold then the diagnostics execution agent 120 transmits to the diagnostics service 104 a message indicating that the test has passed. If the audio level is less than the threshold then the diagnostics execution agent 120 transmits to the diagnostics service 104 a message indicating that the test has failed.

j. Volume Test

The diagnostics service 104 initiates a volume test by transmitting a message to the turret 118 instructing the diagnostics execution agent 120 to send a local tone out of a handset of the turret 118 and loop it back in the A/D converter 202 to the audio processor 203. The audio processor 203 measures the receive volume at one or more transmit volume levels and compares the audio level to a predetermined threshold, which is adjusted based on the user handset transmit volume. If the audio level is greater than or equal to the threshold then the diagnostics execution agent 120 transmits to the diagnostics service 104 a message indicating that the test has passed. If the audio level is less than the threshold then the diagnostics execution agent 120 transmits to the diagnostics service 104 a message indicating that the test has failed.

k. Intercom Test

The diagnostics service 104 initiates an intercom test by transmitting a message to the turret 118 instructing the diagnostics execution agent 120 to make a direct intercom call from a local turret to a distant turret via a handsfree module on the a local turret, with loopback enabled in distant turret. The audio processor 203 measures and compares the audio level to a predetermined threshold. If the audio level is greater than or equal to the threshold then the diagnostics execution agent 120 transmits to the diagnostics service 104 a message indicating that the test has passed. If the audio level is less than the threshold then the diagnostics execution agent 120 transmits to the diagnostics service 104 a message indicating that the test has failed. In addition, the audio processor 203 measures the roundtrip mouth to ear delay from the local turret to the distant turret and transmits the measurement to the diagnostics service 104.

l. Conference Turret-to-Turret Via Media Server Test

The diagnostics service 104 initiates a conference turret to turret via media server test by transmitting a message to the turret 118 instructing the diagnostics execution agent 120 to open a common manual ringdown communication line on both a source turret and a destination turret. Both the source turret and the destination turret are in conference via a media server. The audio coupling between the source turret and the destination turret via the media server is tested. In particular, the audio processor 203 measures an audio level, a frequency response, and/or a time delay. The audio processor 203 compares the measured audio level, frequency response, and/or time delay to predetermined threshold(s). If the audio level, frequency response, and/or time delay are greater than or equal to the threshold(s) then the diagnostics execution agent 120 transmits to the diagnostics service 104 a message indicating that the test has passed. If the audio level, frequency response, and/or time delay are less than the threshold(s) then the diagnostics execution agent 120 transmits to the diagnostics service 104 a message indicating that the test has failed, and optionally indicating details regarding any failure(s). For example, the message may include a measured audio level, a measured frequency response, and a measured time delay.

m. Turret-To-Turret Dialtone Test

The diagnostics service 104 initiates a turret-to-turret dialtone test by transmitting a message to the turret 118 instructing the diagnostics execution agent 120 of a source turret to activate a dialtone communication line on its handset and to dial digits corresponding to a destination turret. The audio processor 203 of the destination turret detects an incoming ring notification and answers the call on its handset. This tests an audio coupling between the source turret and the destination turret directly for internal calls or via a PBX for external calls. In particular, the audio processor 203 measures an audio level, a frequency response, and/or a delay. The audio processor 203 compares the measured audio level, frequency response, and/or delay to predetermined threshold(s). If the audio level, frequency response, and/or delay are greater than or equal to the threshold(s) then the diagnostics execution agent 120 transmits to the diagnostics service 104 a message indicating that the test has passed. If the audio level, frequency response, and/or delay are less than the threshold(s) then the diagnostics execution agent 120 transmits to the diagnostics service 104 a message indicating that the test has failed, and optionally indicating details regarding any failure(s).

n. Turret-To-Turret Speeddial Test

The diagnostics service 104 initiates a turret-to-turret speeddial test by transmitting a message to the turret 118 instructing the diagnostics execution agent 120 of a source turret to activate a speeddial button on its handset, causing the dialing of digits corresponding to a destination turret. The audio processor 203 of the destination turret detects an incoming ring notification and answers the call on its handset. This tests an audio coupling between the source turret and the destination turret directly for internal calls or via a PBX for external calls. In particular, the audio processor 203 measures an audio level, a frequency response, and/or a delay. The audio processor 203 compares the measured audio level, frequency response, and/or delay to predetermined threshold(s). If the audio level, frequency response, and/or delay are greater than or equal to the threshold(s) then the diagnostics execution agent 120 transmits to the diagnostics service 104 a message indicating that the test has passed. If the audio level, frequency response, and/or delay are less than the threshold(s) then the diagnostics execution agent 120 transmits to the diagnostics service 104 a message indicating that the test has failed, and optionally indicating details regarding any failure(s).

o. Voice Recorder Test

The diagnostics service 104 initiates a voice recorder test by transmitting a message to the turret 118 instructing the diagnostics execution agent 120 to activate voice recording via the recording application 115 and to activate one or more communication channels of the turret 118. The audio processor 203 transmits from the microphone of the activated channel to the recording application 115 via a communication network a voice message including voice data, a user identifier and a channel identifier. Alternatively, the user identifier and/or the channel identifier may be transmitted as voice data. For example, the voice data may, when audibly reproduced, indicate the user identifier and/or the channel identifier. An administrator can then verify the data recorded on the recording application 115 via the management system client 102.

2. Self Tests

Referring back to FIG. 6, block 602 represents device self tests. Examples of device self tests include a media gateway self test and a turret self test. In a self test, which may be a power-on self test ("POST") or a built-in self test ("BIT"), basic functionality of internal systems is tested by the device being tested. For example, in a media gateway self test, the media gateway executes tests on itself, verifying for example that the communication line interface is operating correctly.

3. Time Verification Tests

Block 603 represents time verification tests. Examples of time verification tests include an application server ("A/S") to A/S time verification test, an A/S to media server time verification test, an A/S to media gateway time verification test, an A/S to turret time verification test, and an A/S to external NTP server time verification test. The diagnostics service 104 executes a time verification test by querying a target device for a target time, retrieving the target time, and comparing the target time with a time retrieved from a remote NTP server.

4. Database Integrity Tests

Block 604 represents database integrity tests. The diagnostics service 104 executes database integrity tests to verify that the databases 108 and 109 have not been corrupted. Database integrity tests verify that data entered into the databases 108 or 109 is accurate, valid, and consistent. Three basic types of database integrity constraints are (1) entity integrity, which does not permit any two rows to have the same identity within a table, (2) domain integrity, which restricts data to predefined data types (e.g., dates), and (3) referential integrity, which requires the existence of a related row in another table (e.g., a customer for a given customer ID).

5. Configuration Verification Tests

Block 605 represents configuration verification tests. Examples of configuration verification tests include a media gateway configuration verification test, a media server configuration verification test, and a turret configuration verification test. The diagnostics service 104 executes configuration verification tests to verify that devices (e.g., a media gateway, a media server, a turret) have been programmed correctly, and that there are no configuration parameters missing from a device that would prevent the device from powering on and functioning.

6. Software Version Verification Tests

Block 606 represents software version verification tests. Examples of software version verification tests include a local A/S software version verification test, a remote A/S software version verification test, a media server software version verification test, a media gateway software version verification test, a turret software version verification test, and a desktop application or softphone software version verification test. The diagnostics service 104 executes software version verification tests by polling software components for software version information and comparing the responses, if any, to records stored in the inventory database 108 to ensure that the correct software version is installed on a particular device.

7. Turret Tests

Block 607 represents turret tests. Examples of turret tests include a read button module test, a repetitive test, a logon turret test, a logoff turret test, a restore logon turret test, a speed dial turret test, and a configuration change turret test.

a. Button Module Test

The diagnostics service 104 executes a button module test by transmitting a message to the turret 118 instructing the diagnostics execution agent 120 to return a message indicating the current text being displayed on a button module. The diagnostics service 104 forwards the response message to the management system client 102 to be displayed via a GUI enabling an administrator to determine whether the button display is correct.

b. Repetitive Test

The diagnostics service 104 executes a repetitive test by transmitting a message to the turret 118 instructing the diagnostics execution agent 120 to execute any predetermined test repeatedly, either for a predetermined number of times or until a failure is detected. The diagnostics execution agent 120 transmits to the diagnostics service 104 a message indicating that the test is passing or that a failure was detected after a particular number of executions. This tests the reliability and/or robustness of certain functionality of the turret 118.

8. Media Gateway Test

Block 608 represents media gateway tests, such as a line status verification test. The diagnostics service 104 executes media gateway tests to verify, for example, that media gateway lines are physically coupled, that the media gateway lines are live, etc.

9. Automatic Fault Management ("AFM") Test

Block 609 represents AFM tests. Examples of AFM tests include an AFM test trap. The diagnostics service 104 executes AFM tests to verify that alarm signals are operating correctly. In particular, the diagnostics service 104 transmits a test trap to an AFM interface, and verifies that the test trap is received at a local trap management system.

10. Call Control Tests

Block 610 represents call control tests. Examples of call control tests include a private line connection test, a dial tone line connection test, an intercom connection test, an inbound call routing test, and a voice recording test. Call control tests are executed via the administrator PC 101. In particular, a set of test user profiles is generated via the management system client 102. A test profile is GUI element that emulates a turret and contains button and speaker configurations. The test profile also includes references to test extensions, configured private communication lines, dial tone lines, and speed-dial entries. To execute a call control test of a turret, the test profiles log onto the turret being tested and, for example, make a call via the turret. In this case, the voice channel of the turret being tested is used by the test profile. As discussed above with respect to FIG. 4, a test that has the potential to generate a conflict with a user of the turret, such as a call control test, may be scheduled to execute at a time when the turret is less likely to be used. Call control tests, particularly audio tests, are discussed in further detail above with respect to FIGS. 7 through 10.

III. Example Implementations

The present invention (e.g., systems 100, 700, 800, 900, and 1000, procedures 400, 500, and 601 through 610, or any part(s) or function(s) thereof) can be implemented using hardware, software or a combination thereof and can be implemented in one or more computers or other processing systems. However, the manipulations performed by the present invention were often referred to in terms, such as establishing or discovering, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 11:
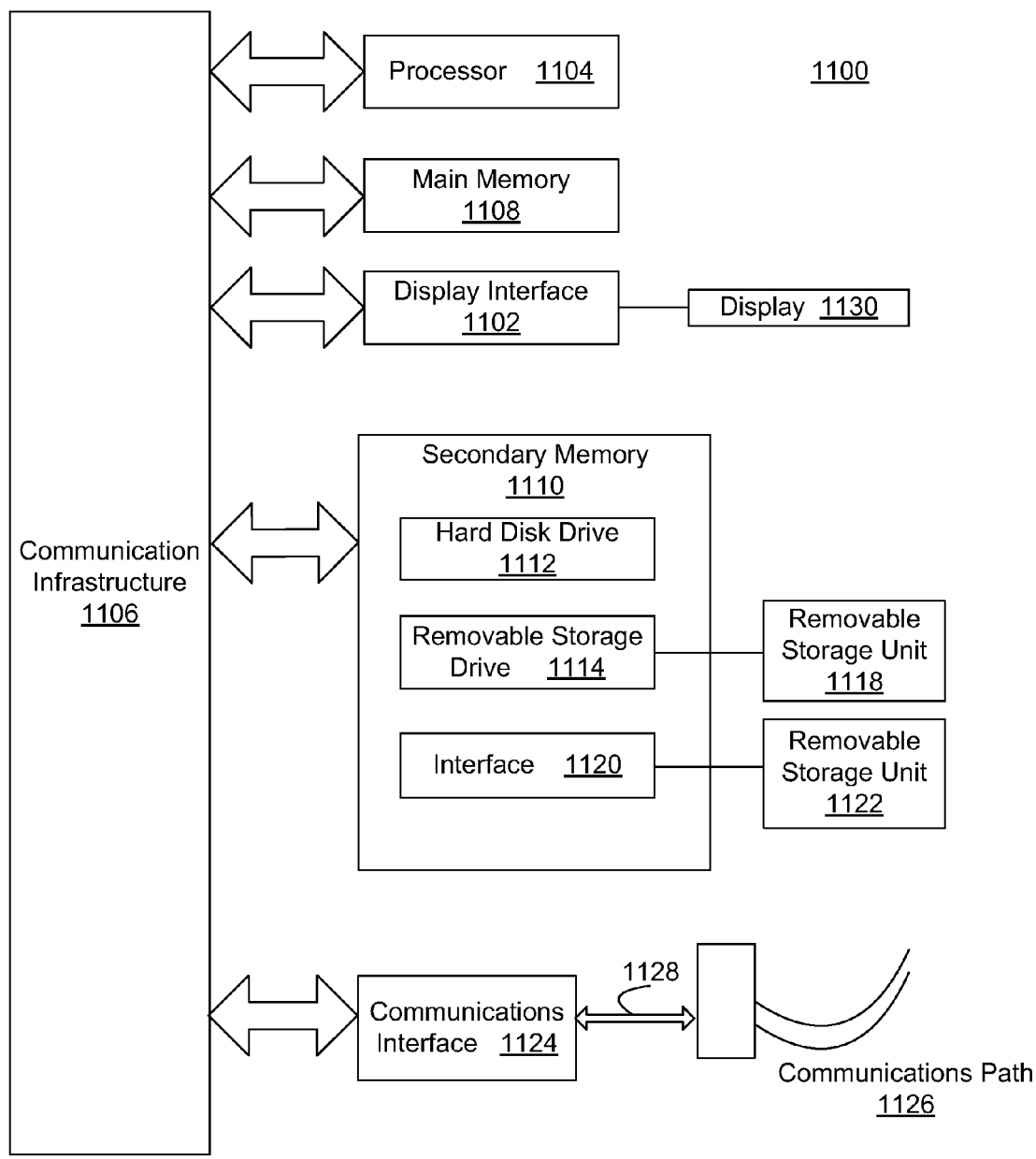
FIG. 11 is a block diagram of an example computer useful for implementing the present invention.

In fact, in one embodiment, the invention is directed toward one or more computers capable of carrying out the functionality described herein. An example of a computer 1100 is shown in FIG. 11.

Computer 1100 includes one or more processors, such as processor 1104. The processor 1104 is coupled to a communication infrastructure 1106 (e.g., a communications bus, cross-over bar, or network). Various software embodiments are described in terms of this example computer. After reading this description, it will become apparent to a person skilled in the relevant art(s) how to implement the invention using other computers and/or architectures.

Computer 1100 can include a display interface 1102 that forwards graphics, text, and other data from the communication infrastructure 1106 (or from a frame buffer not shown) for display on the display unit 1130.

Computer 1100 also includes a main memory 1108, such as random access memory (RAM), and can also include a secondary memory 1110. The secondary memory 1110 can include, for example, a hard disk drive 1112 and/or a removable storage drive 1114, representing a floppy disk drive, a magnetic tape drive, an optical disk drive, etc. The removable storage drive 1114 reads from and/or writes to a removable storage unit 1118 in a well known manner. Removable storage unit 1118 represents a floppy disk, magnetic tape, optical disk, etc. which is read by and written to by removable storage drive 1114. As will be appreciated, the removable storage unit 1118 includes a computer usable storage medium having stored therein computer software and/or data.

In alternative embodiments, secondary memory 1110 can include other similar devices for allowing computer programs or other instructions to be loaded into computer 1100. Such devices can include, for example, a removable storage unit 1122 and an interface 1120. Examples of such can include a program cartridge and cartridge interface (such as that found in video game devices), a removable memory chip (such as an erasable programmable read only memory (EPROM), or programmable read only memory (PROM)) and associated socket, and other removable storage units 1122 and interfaces 1120, which allow software and data to be transferred from the removable storage unit 1122 to computer 1100.

Computer 1100 can also include a communications interface 1124. Communications interface 1124 allows software and data to be transferred between computer 1100 and external devices. Examples of communications interface 1124 can include a modem, a network interface (such as an Ethernet card), a communications port, a Personal Computer Memory Card International Association (PCMCIA) slot and card, etc. Software and data transferred via communications interface 1124 are in the form of signals 1128 which can be electronic, electromagnetic, optical or other signals capable of being received by communications interface 1124. These signals 1128 are provided to communications interface 1124 via a communications path (e.g., channel) 1126. This channel 1126 carries signals 1128 and can be implemented using wire or cable, fiber optics, a telephone line, a cellular link, a radio frequency (RF) link and other communications channels.

In this document, the terms "computer program medium," "computer-readable medium," and "computer-usable medium" are used to generally refer to media such as removable storage drive 1114, a hard disk installed in hard disk drive 1112, and/or signals 1128. These computer program products provide software to computer 1100. The invention is directed to such computer program products.

Computer programs (also referred to as computer control logic) are stored in main memory 1108 and/or secondary memory 1110. Computer programs can also be received via communications interface 1124. Such computer programs, when executed, enable the computer 1100 to perform the features of the present invention, as discussed herein. In particular, the computer programs, when executed, enable the processor 1104 to perform the features of the present invention. Accordingly, such computer programs represent controllers of the computer 1100.

In an embodiment where the invention is implemented using software, the software can be stored in a computer program product and loaded into computer 1100 using removable storage drive 1114, hard drive 1112 or communications interface 1124. The control logic (software), when executed by the processor 1104, causes the processor 1104 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described example embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it can be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and procedures recited in the claims need not be performed in the order presented.

What is claimed is:

1. A system for testing a voice communication system, the system comprising:
    a first turret including a first turret memory coupled to a first turret processor;
    a second turret including a second turret memory coupled to a second turret processor,
        wherein at least one of the first turret or the second turret includes a target component, a message bus, and an automation daemon, the automation daemon being configured to (i) receive, from an application server via a communications network, a job instruction associated with the target component and (ii) transmit the job instruction to the target component via the message bus, and
        wherein at least one of the first turret processor or the second turret processor is configured to (i) execute at least one diagnostic test associated with the target component in response to receiving the job instruction via the message bus and (ii) determine one or more results of the at least one diagnostic test; and
    the application server including an application memory coupled to an application processor, wherein the application processor is configured to:
        pair the first turret and the second turret for testing,
        establish a call session between the first turret and the second turret,
        transmit, to the automation daemon of at least one of the first turret or the second turret via the communications network, the job instruction,
        cause at least one of the first turret processor or the second turret processor to (i) execute, during the call session, the at least one diagnostic test associated with the target component in response to receiving the job instruction and (ii) determine one or more results of the at least one diagnostic test, and
        receive, from at least one of the first turret or the second turret via the communications network, a message including the one or more results of the at least one diagnostic test.

2. The system of claim 1, wherein the at least one diagnostic test includes at least one of an audio test, a speech power test, a noise power test, an anomaly detection test, a loopback test, a peak frequency test, an echo return loss test, a round-trip delay test, a DTMF test, a volume test, an intercom test, a conference test, or a voice recorder test.

3. The system of claim 1, wherein the application server further includes a plugin that translates a message into a communication protocol based on a table, stored in a database, that matches communication protocols to components.

4. The system of claim 1, wherein at least one of the first turret or the second turret further includes a diagnostics execution agent that executes the at least one diagnostic test based on the job instruction.

5. The system of claim 1, wherein the application server further includes a diagnostics controller that receives diagnostic job configuration data from an administrator computer, and stores the job configuration data in a database.

6. The system of claim 1, wherein the job instruction includes a time identifier, and wherein at least one of the first turret or the second turret executes the at least one diagnostic test based on the time identifier.

7. The system of claim 1, wherein the application processor is further configured to:
    determine whether the job instruction corresponds to a job that is service-affecting; and if the job instruction corresponds to a job that is service-affecting then transmitting a warning message to an administrator computer.

8. The system of claim 1, wherein the target component includes at least one of an analog-to-digital converter, an audio service application, a telephony application, an audio processor, a button driver, or a light emitting diode (LED) driver.

9. A method for testing a voice communication system, the method comprising the steps of:
pairing, by an application server, a first turret and a second turret for testing, the first turret including a first turret processor and the second turret including a second turret processor, wherein at least one of the first turret or the second turret includes a target component, a message bus, and an automation daemon;
establishing, by the application server, a call session between the first turret and the second turret;
transmitting, from the application server to the automation daemon of at least one of the first turret or the second turret via the communications network, a job instruction associated with the target component;
transmitting, by the automation daemon, the job instruction to the target component via the message bus;
causing at least one of the first turret processor or the second turret processor to (i) execute, during the call session, at least one diagnostic test associated with the target component in response to receiving the job instruction via the message bus, and (ii) determining one or more results of the at least one diagnostic test; and
receiving, at the application server from at least one of the first turret or the second turret via the communications network, a message including the one or more results of the at least one diagnostic test.

10. The method of claim 9, wherein the at least one diagnostic test includes at least one of an audio test, a speech power test, a noise power test, an anomaly detection test, a loopback test, a peak frequency test, an echo return loss test, a round-trip delay test, a DTMF test, a volume test, an intercom test, a conference test, or a voice recorder test.

11. The method of claim 9, wherein the application server further includes a plugin that translates a message into a communication protocol based on a table, stored in a database, that matches communication protocols to components.

12. The method of claim 9, wherein at least one of the first turret or the second turret further includes a diagnostics execution agent that executes the at least one diagnostic test based on the job instruction.

13. The method of claim 9, wherein the application server further includes a diagnostics controller that receives diagnostic job configuration data from an administrator computer, and stores the job configuration data in a database.

14. The method of claim 9, wherein the job instruction includes a time identifier, and wherein at least one of the first turret or the second turret executes the at least one diagnostic test based on the time identifier.

15. The method of claim 9, further including:
determining whether the job instruction corresponds to a job that is service-affecting; and
transmitting, if the job instruction corresponds to a job that is service-affecting, a warning message to an administrator computer.

16. The method of claim 9, wherein the target component includes at least one of an analog-to-digital converter, an audio service application, a telephony application, an audio processor, a button driver, or a light emitting diode (LED) driver.

17. A non-transitory computer-readable medium having stored thereon sequences of instructions, the sequences of instructions including instructions, which, when executed by a computer system, cause the computer system to:
pair, by an application server, a first turret and a second turret for testing, the first turret including a first turret processor and the second turret including a second turret processor, wherein at least one of the first turret or the second turret includes a target component, a message bus, and an automation daemon;
establish, by the application server, a call session between the first turret and the second turret;
transmit, from the application server to the automation daemon of at least one of the first turret or the second turret via the communications network, a job instruction associated with the target component;
transmit, by the automation daemon, the job instruction to the target component via the message bus;
cause at least one of the first turret processor or the second turret processor to (i) execute, during the call session, at least one diagnostic test associated with the target component in response to receiving the job instruction via the message bus, and (ii) determine one or more results of the at least one diagnostic test; and
receive, at the application server from at least one of the first turret or the second turret via the communications network, a message including the one or more test results of the at least one diagnostic test.

18. The non-transitory computer-readable medium of claim 17, wherein the at least one diagnostic test includes at least one of an audio test, a speech power test, a noise power test, an anomaly detection test, a loopback test, a peak frequency test, an echo return loss test, a round-trip delay test, a DTMF test, a volume test, an intercom test, a conference test, or a voice recorder test.

19. The non-transitory computer-readable medium of claim 17, wherein the application server further includes a plugin that translates a message into a communication protocol based on a table, stored in a database, that matches communication protocols to components.

20. The non-transitory computer-readable medium of claim 17, wherein at least one of the first turret or the second turret further includes a diagnostics execution agent that executes the at least one diagnostic test based on the job instruction.

21. The non-transitory computer-readable medium of claim 17, wherein the application server further includes a diagnostics controller that receives diagnostic job configuration data from an administrator computer, and stores the job configuration data in a database.

22. The non-transitory computer-readable medium of claim 17, wherein the sequences of instructions further include instructions, which, when executed by a computer system, cause the computer system to:
determine whether the job instruction corresponds to a job that is service-affecting; and
transmit, if the job instruction corresponds to a job that is service-affecting, a warning message to an administrator computer.

23. The non-transitory computer-readable medium of claim 17, wherein the target component includes at least one of an analog-to-digital converter, an audio service application, a telephony application, an audio processor, a button driver, or a light emitting diode (LED) driver.

* * * * *

UNITED STATES PATENT AND TRADEMARK OFFICE
CERTIFICATE OF CORRECTION

PATENT NO. : 8,594,278 B2
APPLICATION NO. : 12/952897
DATED : November 26, 2013
INVENTOR(S) : Pappas et al.

Page 1 of 1

It is certified that error appears in the above-identified patent and that said Letters Patent is hereby corrected as shown below:

In the Specification

COLUMN 2

Line 4, "is provided" should be deleted.

COLUMN 8

Line 49, "a" should read --an--.
Line 64, "as" should read --has--.

COLUMN 15

Line 1, "mouth to ear" should read --mouth-to-ear--.
Line 5, "turret to turret" should read --turret-to-turret--.
Line 50, "Speeddial" should read --Speed-dial--.
Line 52, "speeddial" should read --speed-dial--.
Line 54, "speeddial" should read --speed-dial--.

Signed and Sealed this
Thirtieth Day of December, 2014

Michelle K. Lee
*Deputy Director of the United States Patent and Trademark Office*